United States Patent [19] [11] 3,853,200
Bergson et al. [45] Dec. 10, 1974

[54] METHOD OF DETERMINING COMPLIANCE POLES IN EXHAUST SYSTEM

[75] Inventors: Arnold A. Bergson, Ann Arbor; Paul A. Johns, Grass Lake, both of Mich.

[73] Assignee: Tenneco Inc., Racine, Wis.

[22] Filed: Apr. 29, 1974

[21] Appl. No.: 464,921

Related U.S. Application Data

[63] Continuation-in-part of Ser. No. 340,966, March 14, 1973.

[52] U.S. Cl. ............ 181/35 B, 181/33 D, 181/36 D
[51] Int. Cl. ............................................. F01n 1/00
[58] Field of Search ......... 181/35 B, 33 D, 36 D, 53

[56] References Cited
UNITED STATES PATENTS
1,910,672  5/1933  Bourne .................... 181/35 B UX
2,936,041  5/1960  Sharpe et al. ............. 181/35 B UX
2,943,641  7/1960  Arnold ..................... 181/35 B UX Primary Examiner—Richard B. Wilkinson
Assistant Examiner—John F. Gonzales
Attorney, Agent, or Firm—Harness, Dickey & Pierce

[57] ABSTRACT

Maximum and minimum compliance poles for the exhaust system of an internal combustion engine are determined by means of temperature probes taken when the engine is running under conditions creating the most difficult silencing problems.

5 Claims, 3 Drawing Figures

3,853,200

METHOD OF DETERMINING COMPLIANCE POLES IN EXHAUST SYSTEM

RELATED APPLICATION

This application is a continuation-in-part of our U.S. application Ser. No. 340,966, filed Mar. 14, 1973, entitled "Pulse Converter for Exhaust System" and assigned to the assignee of the present application.

BACKGROUND OF THE INVENTION

In our copending application we have disclosed an internal combustion engine exhaust system in which points or poles of maximum and minimum relative compliance are determined and acoustical inertance means are placed at one or more points of maximum compliance and acoustical compliance means at one or more points of minimum compliance. We disclosed a means for determining the maximum and minimum compliance points involving the measurement of pulse pressures at a number of points along the length of a conduit simulating the exhaust system.

BRIEF SUMMARY OF THE INVENTION

With reference to our copending application, it is the purpose of this invention to provide a thermal method for determining the maximum and minimum compliance points in a heated gas flow system, such as an internal combustion engine exhaust system.

Our invention is based upon the discovery that temperature fluctuations in a conduit used to simulate the flow system are indicative of the maximum and minimum compliance points.

DESCRIPTION OF THE INVENTION

In normal engineering of an exhaust system to achieve silencing, the nodal characteristics of the pipe are determined and silencing devices are arranged in accordance with this information to attenuate the troublesome notes in accordance with the standing wave theory of acoustics. The pulse characteristics of certain engines, especially rotary engines such as the Wankel, preclude this approach and require another as pointed out in some detail in our copending application. We have discovered that instead of conventional acoustical engineering theories it is better to determine the points of maximum and minimum compliance along the length of the exhaust system and achieve silencing by positioning inertance devices at one or more of the maximum compliance points and compliance devices at one or more of the minimum compliance points. In our copending application we described a method of doing this utilizing a probe microphone and an oscilloscope to determine peak pressure readings and pulse widths. This information revealed the relative compliance at various stations along the length of the exhaust system. We have now discovered that a temperature profile of the exhaust system can be used to substantially indicate the location of maximum and minimum compliance points or poles of the system.

Figure 1:
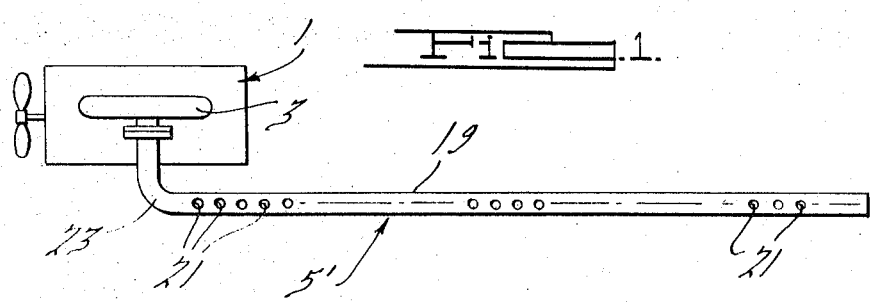
FIG. 1 is a diagrammatic view of an internal combustion engine exhaust system in which a uniform diameter conduit of the length of the exhaust system is utilized to simulate the actual system.
Figure 3:
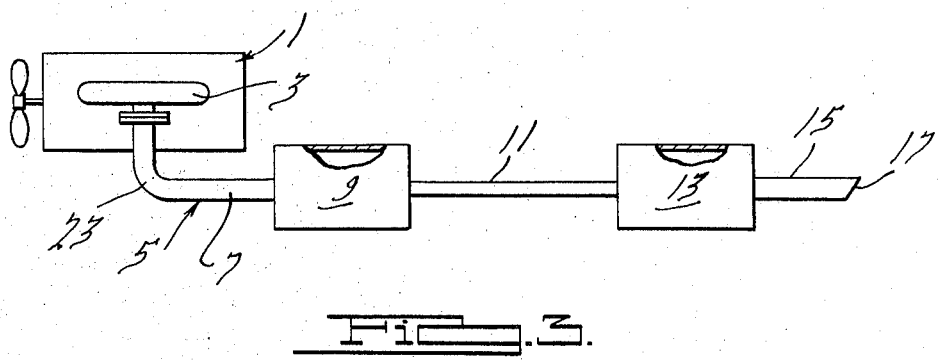
FIG. 3 is a diagrammatic view of the system of FIG. 1 in which silencing elements have been located in accordance with the method of the invention.

Referring to FIGS. 1 and 3, an internal combustion engine 1 has an exhaust manifold 3 which discharges exhaust gases into an exhaust system 5 (or 5' in FIG. 1). As seen in FIG. 3, the system 5 comprises an exhaust pipe 7 leading to an enlarged housing 9 where exhaust gases can expand into the volume of the housing. Gas from the unit 9 enters an intermediate conduit 11 and is subjected to the effect of a substantial reduction in cross-section as it flows along the length of pipe 11 to the unit 13. Unit 13 is illustrated as an enlarged empty housing similar to unit 9 so the gas entering it can expand to its large cross-sectional area. Gas leaving the unit 13 flows through the reduced diameter tailpipe section 15 and out of its open end 17 into the atmosphere.

Figure 2:
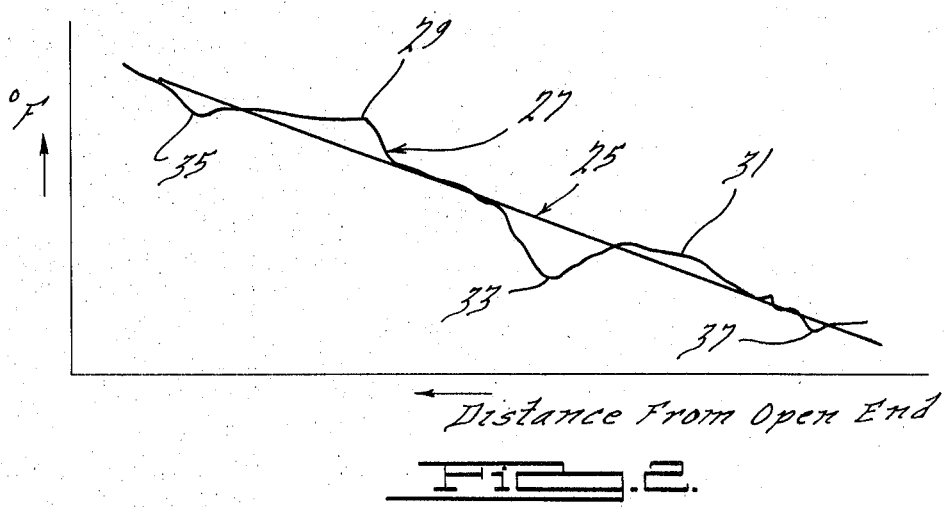
FIG. 2 is a simplified and diagrammatic temperature distribution profile along the conduit of FIG. 1.

In the system 5' of FIG. 1, a uniform diameter conduit 19 having the same overall length as the system just described and the same inner diameter as pipe 7 is substituted for the component parts 7, 9, 11, 13, and 15. It has a series of openings 21 along its entire length which serve to receive temperature sensing devices or probes whereby the temperature at many stations along the length of the pipe 19, and thus the system 5, can be determined. This information, in simplified form, is illustrated by the curves of FIG. 2. It will be seen that the temperature openings 21 commence adjacent the elbow 23 at the upstream end of the system 5; and in the case of systems having a Y-junction, the temperature probes would preferably commence adjacent the stem or downstream end of the Y-junction.

In generalized form, the temperature inside the exhaust system 5 would decrease in a substantially linear fashion from the upstream end to the downstream end of the pipe as illustrated by the straight line 25 in FIG. 2. This line may be determined by measuring and plotting the temperatures at the inlet and outlet ends of the system. Normally, the slope of line 25 (decrease in temperature) is in the order of 10° to 50° per foot depending upon the type of engine, engine speed, engine load, pipe or system characteristics, and other factors. At the open end 17 of the system the temperature may be in the range of 400° to 800° F but this changes to ambient temperature within a very short distance.

Various phenomena, however, seem to affect the temperature at certain points in the system and variations of + 50° F or more from the linear may exist. These are called thermal anomalies. Thus, at some locations the temperature is higher than the linear curve (e.g., line 25) to provide a positive thermal anomaly, and in other cases the temperature is below the linear curve to provide a negative thermal anomaly. We have found that the positive anomalies exist in the vicinity of increased acoustical pressure or gas flow compression, and that negative anomalies exist in the regions of decreased acoustical pressure or flow expansion. These temperature effects are therefore related to the maximum and minimum compliance points that are described in more detail in our copending application. The positive anomalies correspond to inertance poles or minimum compliance points where there is a rapid compression or increase in pressure over a short length of pipe that is reflected as a localized increase in temperature. The negative anomalies are found where there is a rapid expansion or reduction in pressure that is reflected as a temperature decrease. The greater the temperature deviation from the linear curve 25 in a short length of pipe the more significant is the compliance or inertance information at that point. Some systems produce larger deviations or anomalies in short sections of pipe than others and these are most useful as data for the exhaust system engineer.

The temperature profile curve 27 represents in simplified and diagrammatic fashion the actual plot of temperature data that may be obtained by temperature readings at the stations 21 along the conduit 19 for the system 5. Significant positive anomalies 29 and 31 can be observed as well as a significant negative anomaly 33. The positive points or poles 29 and 31 correspond to minimum compliance (maximum inertance) poles in the system 5 and the negative point 33 corresponds to a maximum compliance point for the system.

In accordance with the disclosure of our copending application, compliance devices are placed at the minimum compliance poles 29 and 31 and an inertance device at the maximum compliance pole 33. The housings 9 and 13 illustrate compliance units that are referably substantially centered at the locations of stations 29 and 31. Pipe 11 is preferably somewhat smaller in cross section than pipes 7 and 15 and therefore provides somewhat increased flow resistance and serves as an effective inertance device covering the region of maximum compliance pole 33. The pipe sections 7 and 15 also act as inertances to provide corrections at the smaller peak compliance points 37 and 39 near the upstream and downstream ends of the system. The number of compliances and inertances used can vary depending upon the severity of the conditions to be corrected. Various other compliance and inertance structures and techniques may be utilized as pointed out in the copending case and the present invention is not limited to those illustrated in FIG. 3.

The invention therefore provides a method that may be used by the engineer to attenuate sound or audible notes in the acoustic pulsations of a heated gas flow system. In applying the method, the source of gas, e.g., a Wankel or other internal combustion engine, is operated at the highest sound pressure or under conditions that create the most troublesome silencing problems. A uniform diameter conduit 19 is used for the exhaust or flow system, and the temperatures are measured along its length and plotted as described above to obtain a characteristic temperature profile. The main positive deviations from a straight line temperature gradient, representing a linear temperature decrease between the inlet and outlet of the system, correspond to low compliance points and the main negative deviations correspond to high compliance points. One or more compliance and inertance devices are then placed in the system substantially at the low and high points, respectively. These devices appear to break up high energy pulses or shock waves to produce attenuation. If satisfactory attenuation is not produced by the devices themselves, additional silencing means (not shown in system 5) may be used downstream of device 13. This may be conventional design since the compliance and inertance devices produce wave forms that are amenable to attenuation by standard structures and techniques.

Modifications may be made in the specific details and structures described without departing from the spirit and scope of the invention.

We claim:

1. A method of testing for the points of high and low compliance in the acoustical pulsations of a heated gas flow system having a predetermined length which comprises attaching a uniform diameter conduit of said predetermined length to the source of said acoustical pulsating hot gas flow to provide a uniform diameter passage for gas to flow the length of the system, determining the linear decrease in temperature from the inlet end of the conduit to the outlet end by measuring the temperatures at the inlet end and the outlet end, determining the actual temperature profile of the conduit by measuring the gas temperature at numerous points along the length of the conduit while gas is flowing through the conduit at a desired rate of flow and pressure, and determining thermal anomalies by comparing the actual temperature profile with the linear decrease in temperature, the points where maximum decreases of temperature as compared with the linear slope occur indicating points of maximum compliance and the points of maximum increase in temperature with respect to the linear profile indicating maximum inertance points.

2. A method as set forth in claim 1 including the step of causing gas to flow through the conduit at a rate and pressure that causes substantially the highest sound pressure in normal operation of the source and making said temperature measurements when the gas flows at said rate.

3. In the method of attenuating audible notes in acoustical pulsations in a hot gas flow system of predetermined length, the steps of measuring the actual gas temperatures at numerous points along the length of said system while gas if flowing through the system and utilizing such measurements to locate high and low compliance peaks in the system, placing inertance means in the system substantially at at least one of the high peaks, and placing compliance means in the system substantially at at least one of the low peaks.

4. In a method of attenuating sound associated with acoustical pulsations in an internal combustion engine exhaust gas system or the like by means of compliance volumes and inertances, the steps of attaching a predetermined length of uniform diameter conduit to receive exhaust gas from the engine and to provide a uniform diameter gas passage for gas to flow along the length of the system, utilizing temperature measuring means to obtain temperatures at each of numerous points along the length of the conduit while gas is flowing through the conduit at a desired rate of flow to determine positive and negative thermal anomalies, placing an inertance device in said exhaust system at the location of one of the maximum negative thermal anomalies, and placing compliance volumes in said exhaust system at the location of two of the maximum positive thermal anomalies.

5. In a heated gas flow system such as the exhaust system of an internal combustion engine, said system having a characteristic linear temperature gradient and an actual temperature profile curve for selected flow conditions, said system including a gas flow passage with an inlet and an outlet and flow through sound attenuating means in said passage comprising an acoustic compliance device and an acoustic inertance device in series with said compliance device, said compliance device being located at a longitudinal position in said passage corresponding to the longitudinal position in said temperature profile of a substantially maximum positive deviation of said profile from said linear gradient, and said inertance device being located at a longitudinal position in said passage corresponding to the longitudinal position in said temperature profile of a substantially maximum negative deviation of said profile from said linear gradient.

* * * * *